United States Patent [19]

Bradley et al.

[11] Patent Number: 5,309,564
[45] Date of Patent: May 3, 1994

[54] APPARATUS FOR NETWORKING COMPUTERS FOR MULTIMEDIA APPLICATIONS

[76] Inventors: Graham C. Bradley, 3200 College Avenue, Regina, Saskatchewan, Canada, S4T 1V9; Everett L. Florence, 207 Lincoln Drive, Regina, Saskatchewan, Canada, S4S 6P5; Alton O. Stretton, 3615 McCallum Avenue, Regina, Saskatchewan, Canada, S4S 0S6

[21] Appl. No.: 854,978

[22] Filed: Mar. 19, 1992

[51] Int. Cl.$^5$ .................................. G06F 13/00
[52] U.S. Cl. .................................. 395/200; 395/275
[58] Field of Search ............... 395/200, 275; 370/85.3, 370/85.5, 94.1, 94.2

[56] References Cited

U.S. PATENT DOCUMENTS 3,997,718  12/1976  Ricketts et al. .
4,813,012   3/1989  Valeri et al. .
4,893,326   1/1990  Duran et al. .
4,920,432   4/1990  Eggers et al. .
5,027,400   6/1991  Baji et al. .
5,229,993   7/1993  Foudriat et al. ............ 370/85.3

*Primary Examiner*—Robert L. Richardson

[57] ABSTRACT

This invention relates to network apparatus for the interconnecting personal computers and workstations, for the purpose of efficiently sharing the use of multimedia type computer applications such as programs and files. Multimedia computer programs are those that display on the user's monitor, text information, computer generated graphical information, and all type of picture image information both moving and still images. Disclosed is apparatus for deploying user input/output components of said personal computers and workstations at a desktop location several kilometers from the physical location of said personal computers. The invention embodied herein uses fiber optics transmission and user controlled optical switching. User control is via the Public Switched Telephone Network. The invention provides three advantages to a user such as an educational institution, software savings, hardware savings, and software security.

4 Claims, 9 Drawing Sheets

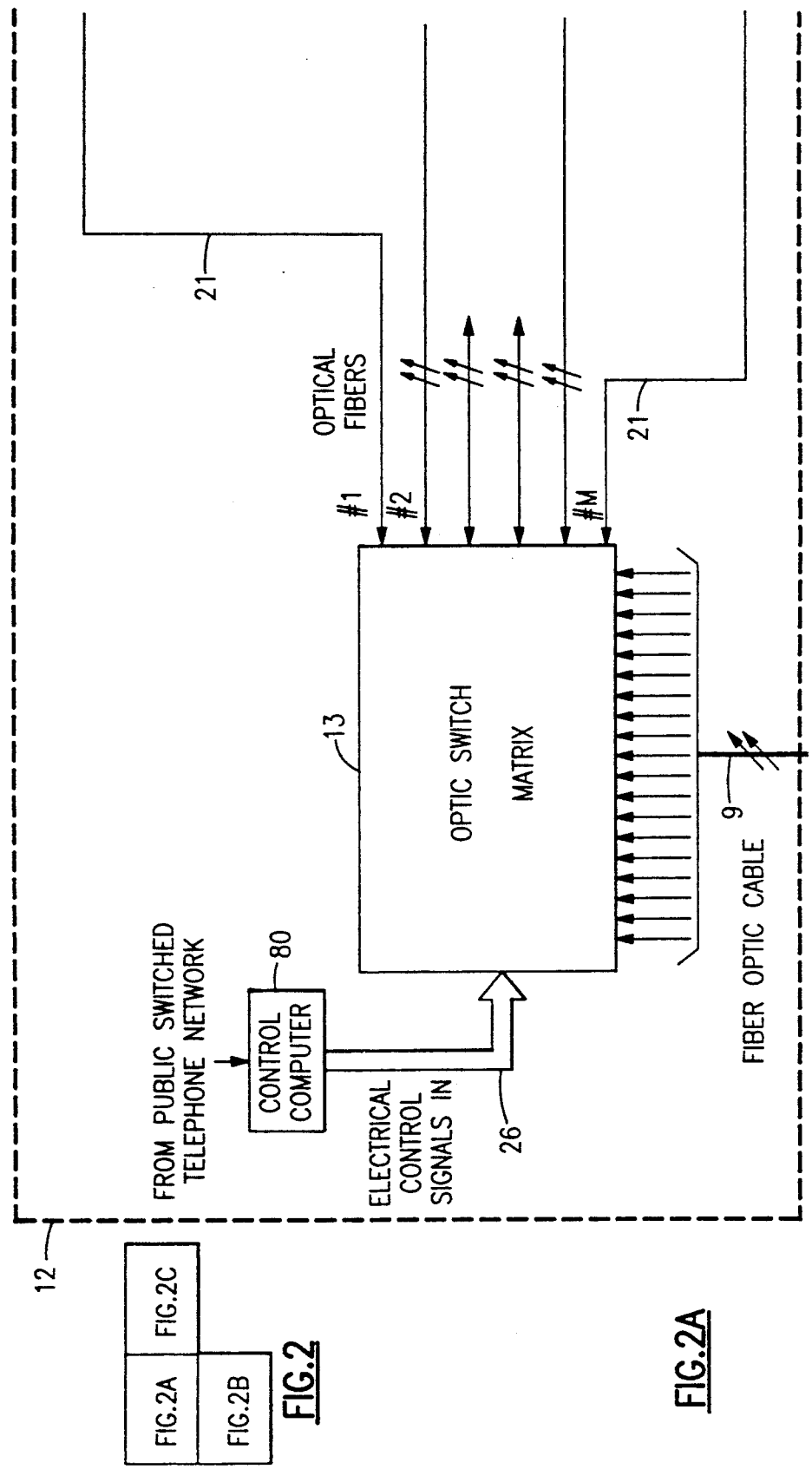

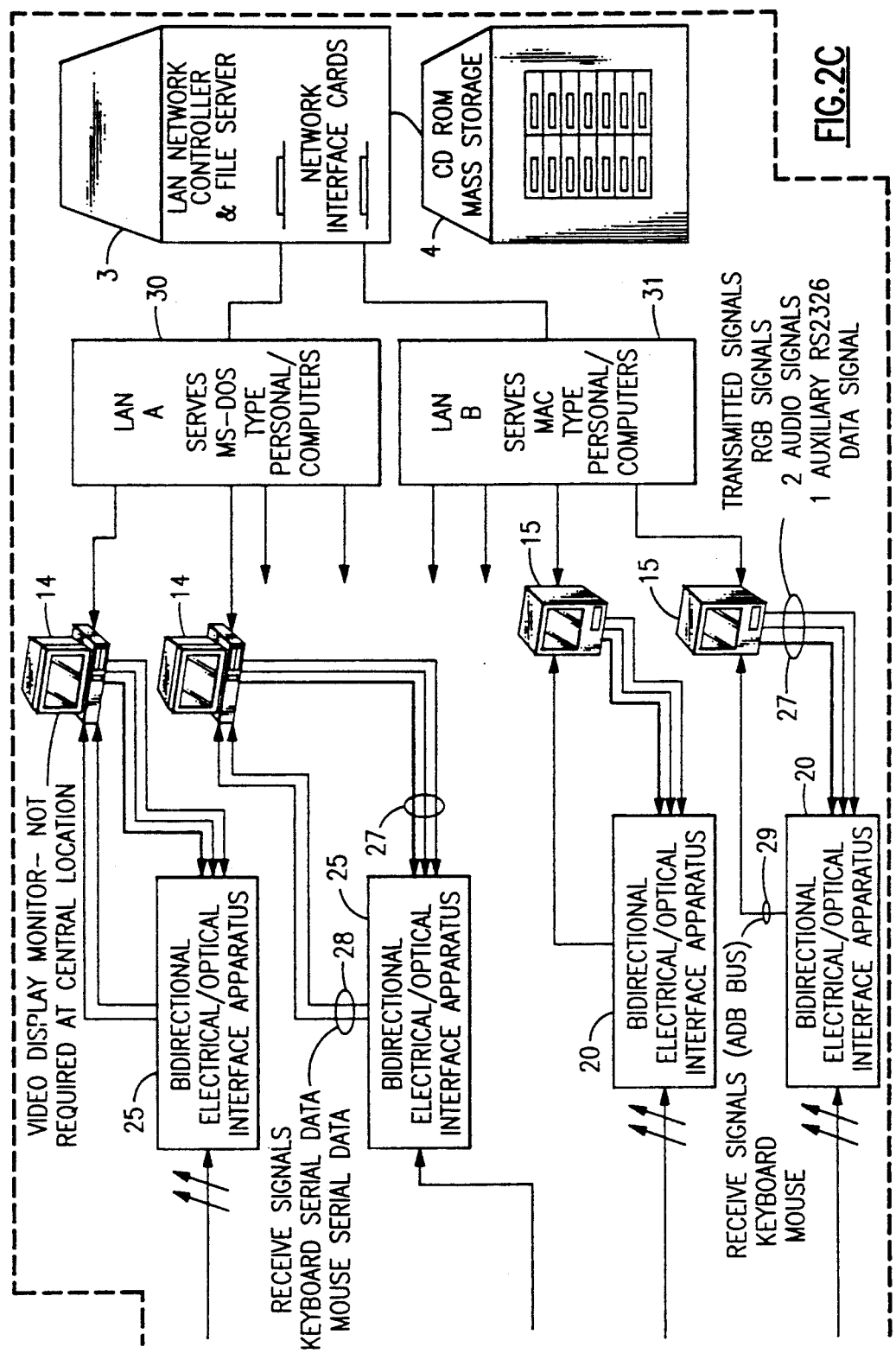

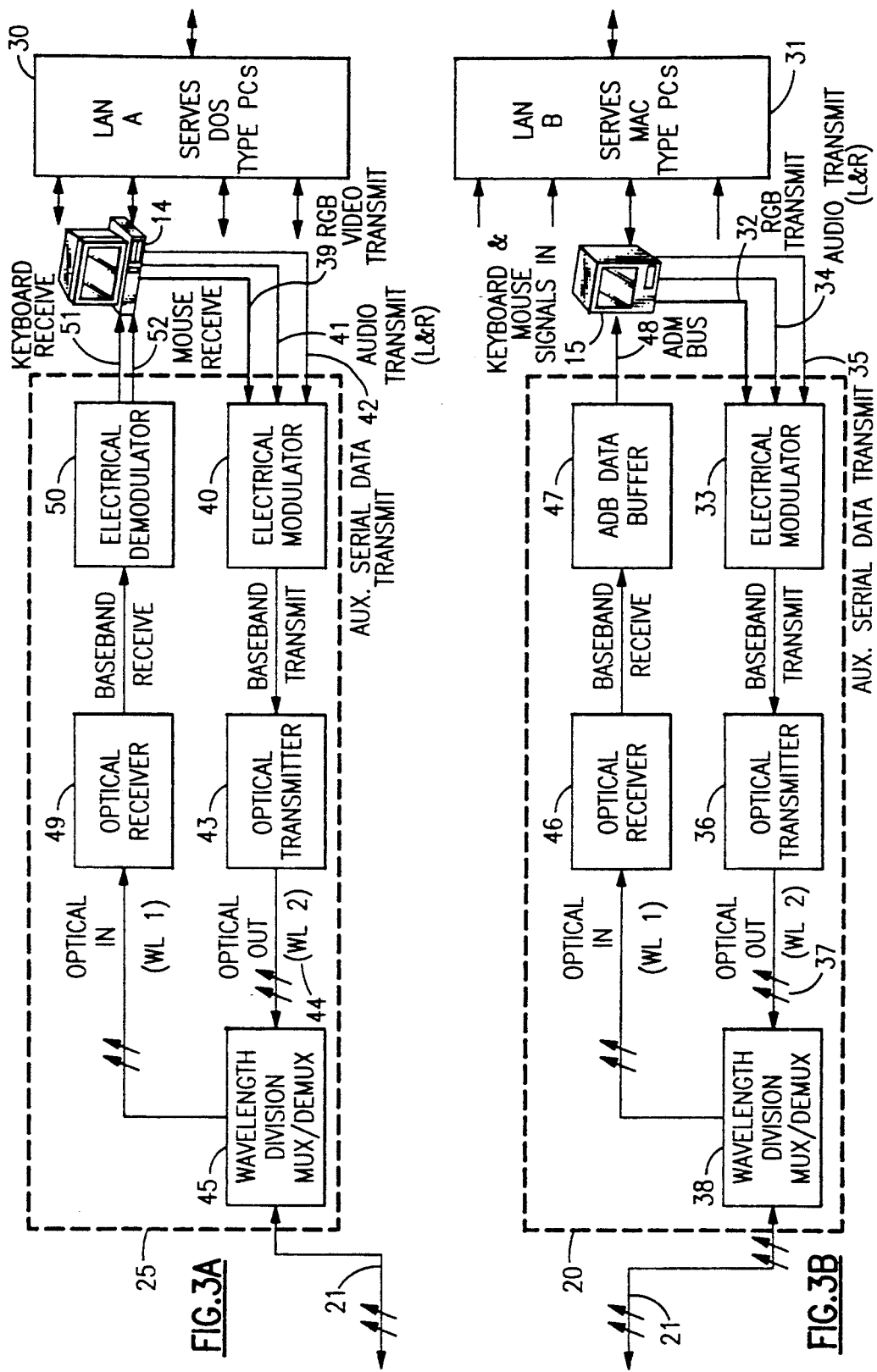

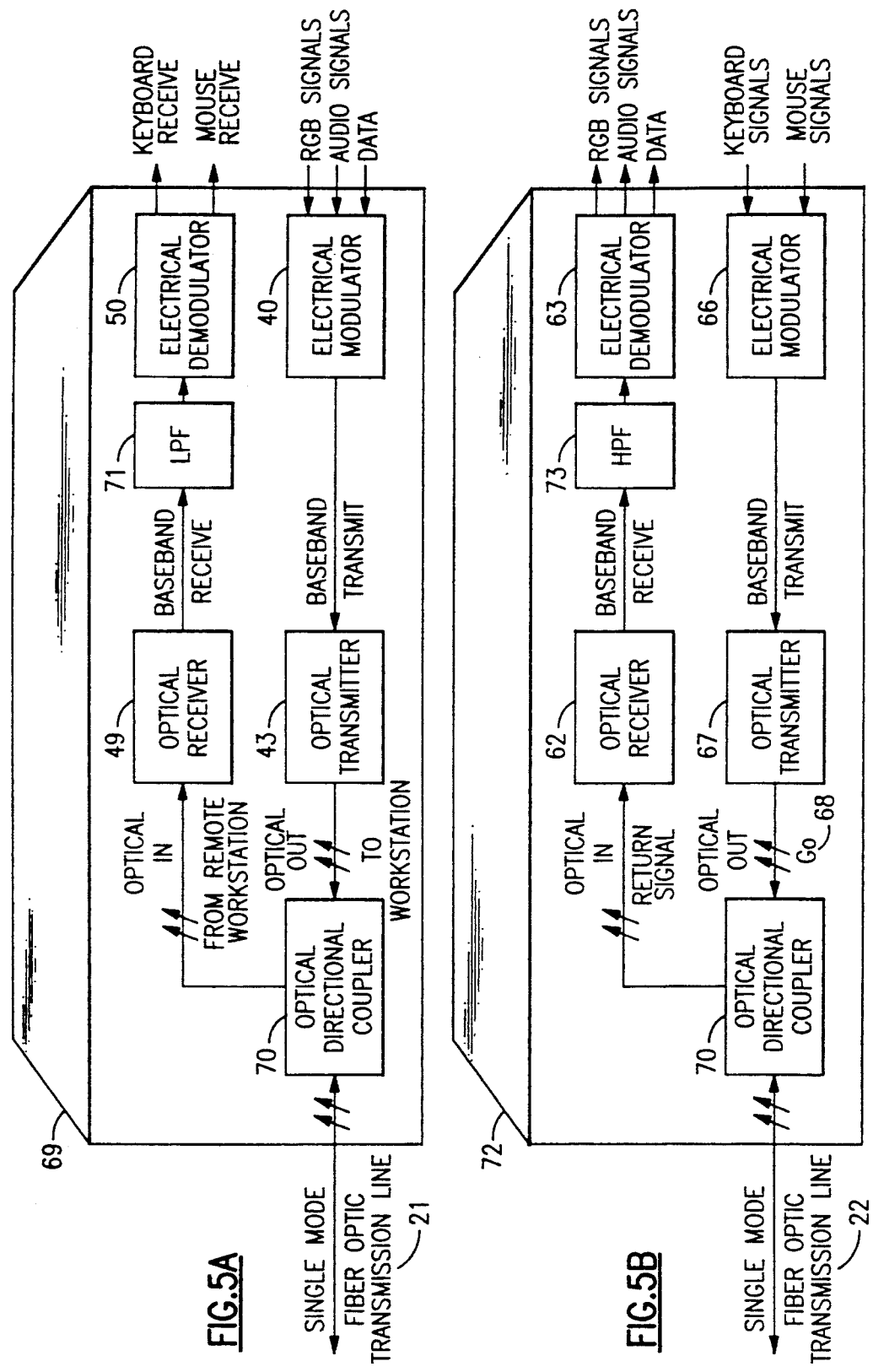

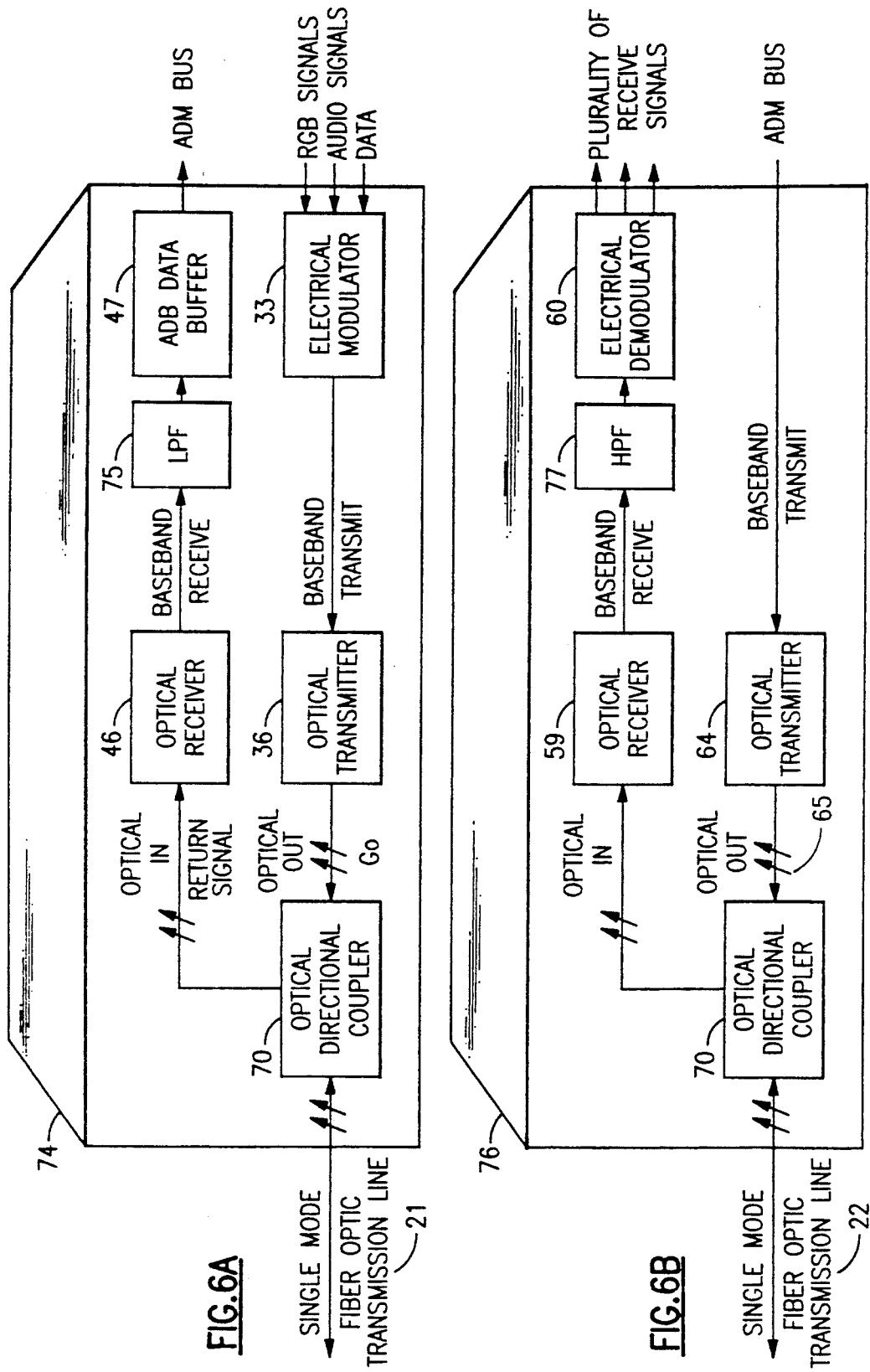

APPARATUS FOR NETWORKING COMPUTERS FOR MULTIMEDIA APPLICATIONS

BACKGROUND OF THE INVENTION

This invention relates to apparatus for the networking of personal computers and workstations, for the purpose of sharing access to and usage of computer programs and files, particularly those of the multimedia type, in a cost effective manner.

Said personal computers and workstations are computers intended for use on, or in close proximity to, the user input/output devices, such as a keyboard, computer mouse and video display screen that are typically located on an individual user's desktop. Disclosed herein is computer interconnection apparatus that is adapted to permit deploying the user input/output components of said personal computers and workstations at a desktop location remote from the physical location of said personal computers and their associated programs and files. The disclosed apparatus permits a plurality of users at different remote locations to use said personal computer apparatus on a shared basis. Said remotely located user apparatus is referred to herein as workstation terminals, or workstations.

Multimedia computer programs are those that display on the user's video display monitor, text type information, computer generated graphical information, and all types of picture image type information. Including full color, still and animated line drawings, photograph quality still pictures, and full motion moving pictures. Multimedia programs are also capable of delivering high fidelity, stereo sound to said user terminal.

Local Area Networks (LAN's) are data communications networks that provide data paths among personal computers or workstations that are localized to a single building, or to a numerically small and physically close, group of buildings. Computer networks that are comprised of an interconnected set of LAN's within a specific area, such as an industrial park, a residential network of public schools, a university campus, or a small urban community, are typically referred to in the art as Metropolitan Area Networks or MANS. The network apparatus described herein is of the metropolitan area type in that it is intended to permit the interconnection of personal computers or workstations to remotely located user-operable input/output devices (i.e. keyboard, mouse and display tube) throughout a metropolitan area. Typically, computer networks need to serve workstations that use different computer operating systems, such as Microsoft MS-DOS workstations (Microsoft and MS-DOS are registered trademarks of the Microsoft Corporation), IBM OS/2 workstations (IBM and OS/2 are registered trademarks of International Business Machines Corporation), and Apple Macintosh workstations (Apple and Macintosh are registered trademarks of Apple Computer, Inc.).

There are three advantages to operating multimedia computing in a network environment compared with an individual workstation environment. The first is software cost savings. Multimedia software packages and associated files are expensive. Networkable versions of said software can often be purchased at considerable cost savings when compared with the purchase of individual workstation copies. The second advantage is hardware savings. With a multimedia network it is possible to maintain all source software and associated program data at one location only. Without such a network, each workstation operates individually in a non-network environment thus requiring each workstation to have its own CD ROM apparatus for storage of the source software and associated program data. Accordingly, with a multimedia network, the larger the number of workstations on the network the greater the software and hardware savings. The third advantage is software security a centralized network controller that is accessible over the network to users of workstations attached to the network, can incorporate security features to ensure that files are protected from unauthorized users. Additional economies may be had through the use of diskless workstations for network users. Moreover use of diskless workstations prevents program data and software file data from being downloaded to disks for unauthorized copying. Diskless workstations also keep the computing environment healthy as users cannot enter personal files at the workstation. Said user files being potentially infected by system crippling computer sabotage known as software viruses.

One important application of multimedia computing is the education system. Educators wish to take advantage of the opportunities that multimedia computer assisted teaching offers. However educational budgets are a limited resource. In order to reduce the cost of a multimedia installation it would be advantageous if a plurality of schools, and a plurality of classrooms and other locations within said schools, could access a central source of multimedia files.

It would also be advantageous if the workstation terminal, could be at a cost lower than that of a personal computer. Personal computers useful for multimedia type computer assisted instruction are expensive due to the requirement for fast processing speed and their requirement to drive high resolution video display monitors.

Educators need to be able to economically upgrade their workstation apparatus as the art advances. The more expensive the workstation the more difficult it is for educators, or other multimedia network operators, to afford a multimedia network and the more difficult it is for said network operators to keep an installed network technologically current and therefore compatible with the latest multimedia software.

Prior art that addresses the need for low cost workstations remotely located from the computer apparatus, utilizes non-intelligent terminals connected to the computer via telephone cable and communications modems. Such art is not suitable in a multimedia environment due to the low data transmission speeds. High resolution, full color, full motion moving pictures require data rates of 200 Mb/s or greater, or 45 Mb/s or higher should the latest video compression apparatus be incorporated.

There is a need for the said multimedia system to be comprised of a network to serve user locations up to 7 kilometers from the central file server location. For example should said file server be located in a secondary school (or high school) said secondary school could serve nearby primary schools and junior high schools.

Prior art that extends MAN operating distance by the use of fiber optics could meet the distance requirements and perhaps provide adequate video quality. One example of which is the Fiber Distributed Data Interface, or FDDI, (FDDI operates at 100 Mb/s). But said art would be more expensive than the invention embodied herein as said art makes no provision for simplified multimedia workstations. FDDI is a fiber optic system standard approved by the International Organization for Standards and the American National Standards Institute.

There is a need for the remotely located multimedia workstations to operate with a performance effectively equivalent to workstations located adjacent to the file server that is user indistinguishable with respect to, video picture quality, data file access speed, and input keyboard and mouse response speed.

Mice and keyboard apparatus are designed and manufactured to be positioned within a few meters of the personal computer that they are connected to. Should such apparatus be moved several kilometers from said computers then the transmission link connecting said apparatus to said computers must meet the timing requirements of the original design. One example of such a mouse/keyboard input apparatus is the Apple Macintosh ADB (Apple Desktop Bus) system (Apple Desktop Bus is a registered trademark of Apple Computer, Inc.). The ADB Bus apparatus uses a polling scheme to interrogate such bus connected devices as a mouse and a keyboard. A mouse movement for example, causes the mouse apparatus to process and store movement information until such time as the ADB bus apparatus requests that the data be transferred from the mouse apparatus to the computer apparatus. The maximum time permitted from the time the computer sends a data request demand to a device and the device is required to respond is 260 micro-seconds for the ADB bus apparatus. Should said ADB bus system interface a computer with said mice/keyboard apparatus located several kilometers apart, said transmission link is required to be sufficiently fast that said timing requirements are met.

There is a need for the previously said plurality of remotely located low cost workstations to share access to and use of a lesser number of centrally located personal computer apparatus. Said shared usage network requires some kind of communication and control apparatus so that said remote user can initiate the connection of said low-cost workstation to one of said personal computers.

The invention embodied herein uses the public telephone system for initiating workstation connections. The advantages of using the public switched telephone network are that connection times are short to establish the workstation link on the network thus permitting one telephone circuit to service a large plurality of users. The telephone network is inexpensive and already in place, and the art of decoding dual-tone multiple frequency telephone signals is well known. One example of prior art that uses the public telephone system to permit the user to control centrally located non-telephone company equipment is: Bradley, Stretten, Stretten, and Wentzel (U.S. Pat. No. 4,878,245).

The general object of this invention is to provide a low cost, high quality, network of remote workstations which provide a plurality of users with access to and use of a centralized data base of multimedia computer files and programs.

It is an object of this invention that said remote workstations shall be able to be located up to 7 kilometers distant from said centrally located data base. The transmission system connecting said workstations to said central data base must be capable of delivering video quality to any remote workstation equal in quality to that viewed on any monitor located at the central data base location. Said monitors being of the type suitable for multimedia applications, that is being capable of displaying photograph quality color images. Said monitors would typically, be of the RGB type, be capable of displaying 1024×768 dots of resolution, have a video bandwidth of up to 3.2 MHz for each of the three RGB signals, have a horizontal scan rate of up to 35 KHz, and have a vertical scan rate up to 70 Hz.

It is a further object of this invention that the said workstation terminals be of a cost lower than that typical of personal computer workstations capable of the high quality of color video performance specified in the previously said objective.

It is an object of this invention that the transmission system connecting said remote workstations to said central data base be capable of providing an input response time that is user indistinguishable from that provided by a similar user operated workstation located at the central data base location. For both said remote workstations and said centrally located workstations said users will perceive no operational degrading delay with respect to both user generated keyboard inputs and user generated mouse inputs. The maximum permitted time from input device interrogation until the reception of the response shall be a maximum of 50% of the time that the Apple Computer ADB bus system permits, or 130 mseconds. The two way transmission time for a 7 kilometer glass fiber transmission line link between a central file server location and a remote workstation location is about 70 mseconds. This leaves a margin of about 60 mseconds for ADB bus and mouse response time, and auxiliary electronic delays at both ends of the transmission line. Therefore the electronic apparatus that interfaces the computing equipment at each end of the transmission line, for both directions of transmission, should not introduce more than 10 mseconds of delay each.

It is an object of this invention that the transmission system will support high fidelity, stereo audio signals. High fidelity being defined as an audio signal with a 3 dB power bandwidth from 50 to 15 KHz.

It is a further object of this invention that the transmission system will provide an Electronic Industries Association (EIA) RS232C compatible communication channel between the centrally located personal computers and the remotely located workstations for most printers, plotters and other such terminal devices.

SUMMARY OF THE INVENTION

In one of its aspects the invention provides a metropolitan area network for transport of computer generated video images and computer user input comprising: at least one central facility housing a plurality of personal computers each computer provided with storage apparatus for retaining software and data for producing high resolution multimedia video images, each said personal computer having a keyboard input port, mouse input port and a video image output port; an electrical to optical interface device provided for each personal computer, each interface device having: an optical input path for producing electric signalling in response to an input light beam on corresponding electrical terminations for said keyboard input port and mouse input port, said signalling adapted to be processed by the personal computer as keyboard input or mouse input respectively, and each interface device having: an optical output path for producing a modulated light beam in response to electrical signalling received on a corresponding electrical termination for said video image output port of said personal computer; a first fiber optic cable optically coupled to the optical input path and optical output path of said interface device extending therefrom and terminating at a fiber optic matrix switch configured to optically couple said first fiber optic cable to a second fiber optical cable extending to one of a plurality of remote user locations; each said remote user location having a fiber optic cable extending therefrom and optically terminated at one end on said fiber optic matrix switch of said central location and at the other end on an electrical to optical interface each interface device having: an optical output path for producing a modulated light beam in response to electrical signalling received on corresponding electrical terminations adapted to be attached to a computer keyboard device and a computer mouse device for producing said electrical signalling, and each interface device having: an optical input path for producing electric signalling in response to an input light beam on a corresponding electrical termination adapted to be attached to a video image display responsive to said electrical signalling; whereby user operation of said remotely located keyboard and mouse devices results in computer processing to occur at a corresponding centrally located personal computer the result of which processing is presented to said user on the remotely located video display.

BRIEF DESCRIPTION OF THE DRAWINGS

FIG. 2 is a general block diagram overview of a Metropolitan Area Network (MAN), and FIGS. 2A, 2B and 2C show further detail block diagrams concerning the Network.

FIGS. 3A and 3B illustrate, in detail functional block diagram form, the components of the central Bi-directional Electrical/Optical Interface Apparatus of FIG. 2C using wavelength division multiplexing of the out and return optical paths.

FIGS. 5A and 5B illustrate, in detail functional block diagram form, the components of an alternate embodiment of the central and remote Bi-directional Electrical/Optical Interface Apparatus of FIG. 2C using the same light wavelength for bi-directional transmission of a DOS type computer.

FIGS. 6A and 6B illustrate, in detail functional block diagram form, the components of an alternate embodiment of the central and remote Bi-directional Electrical/Optical Interface Apparatus of FIG. 2C which uses the same light wavelength for bi-directional transmission of a MAC type computer.—.

DESCRIPTION OF THE PREFERRED EMBODIMENT

Figure 1:
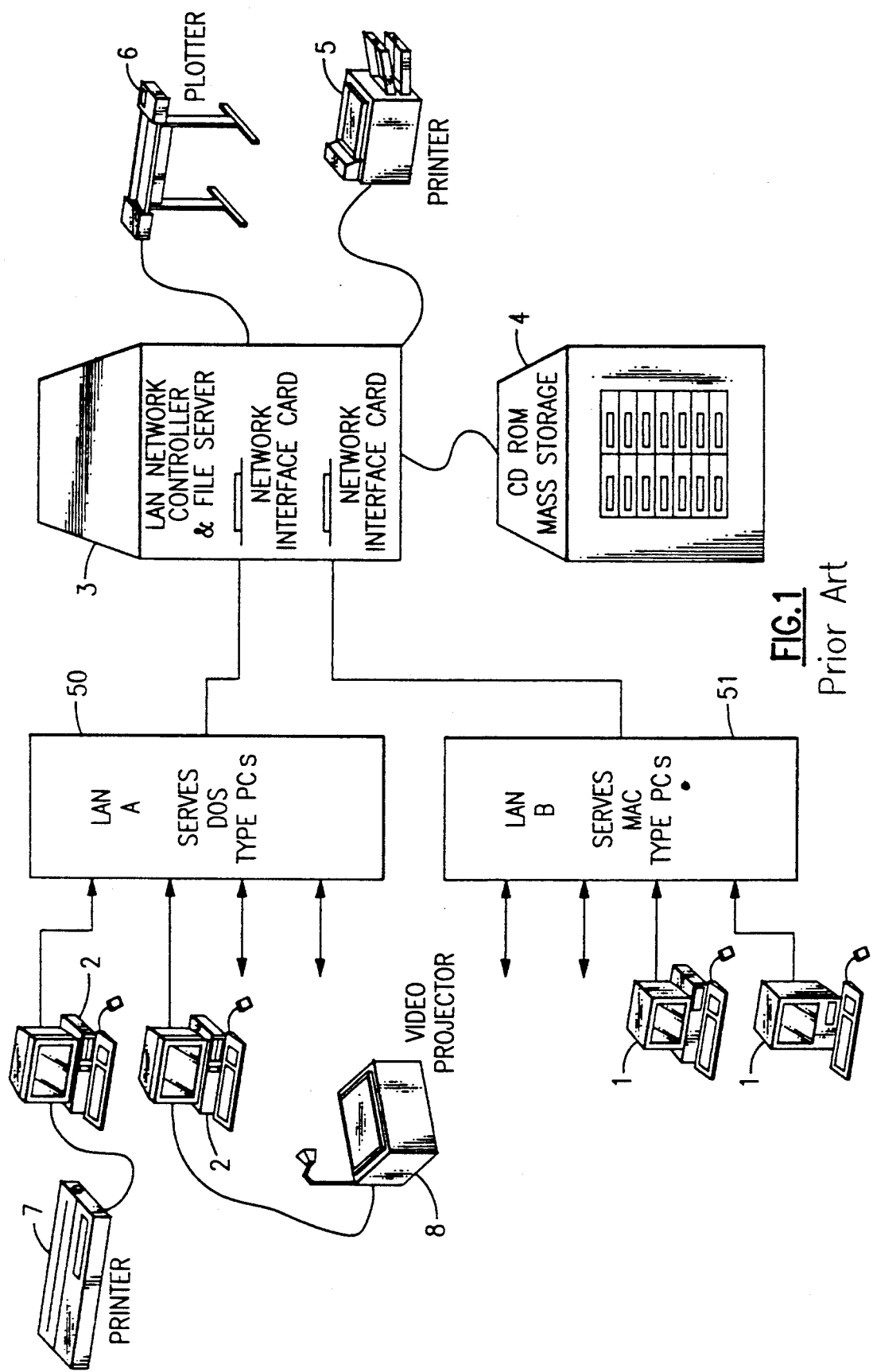
FIG. 1 is a functional block diagram of a sample prior art Local Area Network.

Referring to FIG. 1, which depicts in functional block diagram form an example prior art network showing two LAN networks, one serving Apple Macintosh, or MAC, type personal computers 1, and the second MS-DOS type personal computers 2. The LAN Network Controller and File Server 3 permits all workstations to share files stored in memory devices associated with the File Server 3, including the compact disk read-only-memory mass storage apparatus shown as 4, and referred to as CD ROM. Because of the large memory size required for multimedia data files, said data is typically stored in said CD ROM memory 4. Although the File Server 3 may incorporate printer server apparatus that permits all workstations to share the use of printer 5 and plotter 6, the printer 7 is often configured for use by the workstation to which it is attached only. The video projector 8 would typically be used in a meeting or classroom environment. Said projector enlarges the images normally seen on the computers cathode-ray-tube video display monitor, for viewing by a plurality of viewers.

Should the distance from the file network controller/file server 3 be longer than normal direct copper cable connection permits (up to 2000 feet with one type of coaxial cable LAN system well known in the art), other apparatus also well known in the art is used to extend said distance. Such extender apparatus includes repeaters, modems and fiber optic transmission systems. One characteristic that distinguishes metropolitan area networks from LANs is the incorporation of said distance extending apparatus. The invention embodied herein uses fiber optics and the network is therefore of the metropolitan area type.

FIGS 2, 2A, 2B and 2C are functional block diagram overviews of a Metropolitan Area Network (MAN) in accordance with the present invention. The network apparatus is designed to permit low cost remote workstations at sample locations 10 and 11 to access and use centrally located 12 multimedia programs and files which are stored on mass storage apparatus 4. Said network incorporates an optical transmission line 9 between said remote and said central locations, and an optical matrix switch 13 provided to permit a plurality of N workstations to time-share access to and use of a plurality of M personal computers. As not all workstations will be simultaneously in use, the number of personal computers required will be less than the number of workstations.

Said remote workstations at locations 10 and 11 initiate access to said centrally located personal computers through the use of a telephone instrument and the public telephone network as will be described shortly. Said network incorporates, a plurality of optical transmission cables 9 (only one of which is shown) between a plurality of remotely located workstations, 10 and 11, and a central location 12, and an optical switch 13 which permits a plurality of N number of said workstations (examples of which are shown as 10 and 11,) to time share access to and use a plurality of M number of centrally located personal computers (examples of which are shown as 14 and 15).

As not all workstations, 10 and 11, will be simultaneously in use, the number of personal computers, 14 and 15, required can be less than the number of workstations. The personal computers, 14 and 15, have no keyboards or mice. Keyboard 16 and mouse 17 apparatus are provided at the workstations. This invention reduces the complexity and cost of said personal computers by, relocating said keyboards 16 and mice 17 to said remote workstations, simplifying the complexity of the workstation apparatus, and allocating a lesser number of computers, 14 and 15, than workstations, 10 and 11, Although the computers, 14 and 15 are shown with video display monitors, said video display monitors are not required at the central location 12 but are required at the remote workstation locations, 10 and 11, simply because the network system users are at the remote workstations 10 and 11.

Said remote workstations, 10 and 11, command or initiate access to said centrally located personal computers, 14 and 15, through the use of a telephone instrument 18 located at each workstation and the public telephone network (not shown) which connects the telephone instrument 18 with control computer 80. Control computer 80 then responds to the tones produced by the telephone instrument 18 to activate optical matrix switch 14 to cross-connect the user fiber optic line 9 with a central resource optical fiber 21 thereby establishing a high-bandwidth optical communications path. Printers 19 may be located at said remote workstations if required. Information is exchanged between the central location and the remote locations using a fiber optic transmission system, said transmission system is comprised of apparatus 9, 13, 20, 21, 22, 23, 24, and 25.

Said optical switch matrix 13 completes the connection of any one of a plurality of computer apparatus, 14 and 15, to any one of a plurality of remote workstation apparatus, 10 and 11. Said connection is requested by a workstation user using telephone apparatus 18. Said switch 13 is controlled from each workstation location, 10 and 11, by a user who transmits DTMF control signals using the dial tone generator apparatus of the previously said telephones 18. Apparatus for decoding said DTMF signals is well known in the art. Said decoded control signals are received from said public switched telephone network by said decoder circuits (not shown), and said decoded controls signals are transmitted to the control computer 80. Said control computer generates electrical switch control signals 26 that initiate the completion of the requested optical path connection from one of said plurality of personal computers at said central location to said remote workstation where said service requesting user is located.

Electronic signals 27 transmitted from the centrally located computers, 14 and 15, to the remote workstations, 10 and 11, include 2 audio signals (left and right stereo), a single auxiliary RS 232C data channel for the transmission of data from the computer to remotely located workstation printers 19, and the following monitor signals - red analog video, green analog video, blue analog video, horizontal synch and vertical synch. The video signals are of wide bandwidth as previously said. The previously said fiber optic transmission system, 9, 13, 20, 21, 22, 23, 24 and 25, uses single mode fiber optics with a system bandwidth effectively limited by the frequency response of the light source and the light receiver devices.

Electronic signals, 28 and 29, transmitted from the remote workstations, 10 and 11, and received at the central locations personal computers, 14 and 15, are comprised of non-synchronous keyboard and mouse serial data. The data rate of either said signal is typically less than 20 kB/s. Said signals may be communicated on two separate transmission channels or on a single common transmission channel. Said single common transmission channel can be used as a single workstation user would not input keyboard entries and mouse entries simultaneously. FIG. 2C illustrates both methods being used, it shows DOS keyboard and mouse signals being received on two separate channels 28 but said MAC keyboard and mouse signals being received on a single non-synchronous communications channel 29. Said MAC type computer requires an ADB data buffer apparatus, shown in FIG. 3B as 47, to receive and hold said non-synchronous data until said MAC computer is ready to acquire said data from said buffer.

The plurality of light sources for the central to remote transmission direction, and light receivers for the remote to central direction are located at, 20 and 25; and the plurality of light sources for the remote to central transmission direction and the plurality of light receivers for the central to remote direction are located at 23 and 24.

This invention uses laser diodes for light sources in the central to remote direction as they offer the linear performance characteristic required for the transmission of the analog RGB signals; they also typically offer a higher frequency response than alternative LED light sources. Each electrical signal for transmission in either direction is modulated onto a carrier frequency using frequency modulation, phase shift keying modulation, or frequency shift keying modulation methods. Said modulation apparatus is well known in the art. Said modulated carrier signals are then stacked in the frequency domain to produce a frequency division multiplexed, baseband signal. Said carriers are spaced such that, with the assistance of filters, the resulting modulation sidebands do not overlap in frequency. Use of said spacing and filters is a technique well known in the art.

Said baseband signal is an electrical signal that is used to modulate the light output intensity of a laser diode transmitter. Said modulation is accomplished by adding said baseband signal to the d.c. forward conduction bias current of said laser diode transmitter. The amplitude modulation of a laser diode is well known in the art.

For the remote to central direction of transmission the light sources may be laser diodes or LEDs as the reverse direction carries low bandwidth digital signals only; and therefore the linearity of the light source is unimportant, as is the frequency response requirement for the said direction. However the low light output level of the LEDs may limit their use to shorter remote to central location links.

FIG. 1, FIGS. 2, 2A, 2B and 2C and FIGS. 3A and 3B group the DOS type computers into a DOS local area network or LAN, and the MAC type computers into a second LAN. LAN 30 serves said DOS computers and LAN 31 serves said MAC computers. The network interface cards and software located in the LAN network controller and file server 3 permit computers of different operating system to access common files 4. Said LAN networks, network controller and LAN file server apparatus are well known in the art.

Apparatus shown in FIG. 2B and identified by numbers 44, 46, 54, 55, and 57 are also shown in FIGS. 3A and 3B; said apparatus is described in the following explanation of FIGS. 3A and 3B.

Referring now to FIGS. 3A and 3B which shows in functional block diagram form the central bi-directional electrical/optical components 20 and 25 of FIG. 2C and illustrates two configurations for the compcuents of the bi-directional electric to optical interface apparatus, 20 and 25.

Each of the plurality of MAC type computers 15 transmits RGB video signals on cable 32 to the modulator assembly 33. RGB signals include, the red video signal, the green video signal with vertical synchronization signal, the blue video signal, and the horizontal synchronization signal. The MAC type computer 15 transmits 2 audio signals on cable 34, and an RS232C data signal on cable 35, to the modulator assembly 33. As previously described said modulator assembly 33 modulates the video signals, audio signals and serial data signal onto different carrier frequencies. Said resulting modulated carriers are added together to produce previously said baseband signal. Said baseband signal is an electrical signal that is used to analog modulate the light output intensity of an optical laser diode transmitter 36 as previously described.

The modulated light output in the central to remote location direction is coupled into a single mode glass fiber optic wave-guide 37. Said transmitted light is shown as being at optical wavelength 2. Said optical wave-guide 37 is connected to the wavelength 2 port of the wavelength division multiplexing coupler 38, said wavelength 2 optical signal subsequently appears on one of a plurality of single mode glass fiber optic wave-guide 21. Said optical fiber wave-guide 21 is connected between the dual wavelength port of the wavelength division multiplexer 38 and the optic switch 13 shown in FIGS. 2A and 2C. Said optical signal of wavelength 2 is subsequently received by a similar bi-directional electrical/optic interface device shown in FIG 2B as 23 located at a previously said remote workstation location 10 also shown in FIG. 2B.

Each of the plurality of DOS type computers 14 transmits RGB video signals on cable 39 to the modulator assembly 40. RGB signals include, the red video signal, the green video signal with vertical synchronization signal, the blue video signal, and the horizontal synchronization signal. The DOS type computer 14 transmits 2 audio signals on cable 41, and an RS232C data signal on cable 42, to the modulator assembly 40. Said modulator is similar to that of previously said modulator 33, and as previously described said modulator assembly 40 modulates the video signals, audio signals and serial data signal onto different carrier frequencies. Said resulting modulated carriers are added together to produce previously said baseband signal. Said baseband signal is an electrical signal that is used to analog modulate the light output intensity of an optical laser diode transmitter 43 as previously described.

The modulated light output in the central to remote location direction is coupled into a single mode glass fiber optic wave-guide 44. Said transmitted light is shown as being at optical wavelength 2. Said optical wave-guide 44 is connected to the wavelength 2 port of the wavelength division multiplexing coupler 45, said wavelength 2 optical signal subsequently appears on one of a plurality of single mode glass fiber optic wave-guide 21. Said wave-guide 21 is connected between the dual wavelength port of the wavelength division multiplexer 45 and the optic switch 13 shown in FIGS. 2A and 2C. Said optical signal of wavelength 2 is subsequently received by a similar bi-directional electrical/optic interface device shown in FIG. 2B as 24 and located at one of a plurality of said remote workstation locations 11 also shown in FIG. 2.

Fiber optic cables 21 also carry optical signals at wavelength 1 from said remote workstation locations, 10 and 11, to the dual wavelength port of the wavelength division multiplexing couplers 38 and 45 respectively.

Said optical coupler 38 passes on said light to the wavelength 1 port of said apparatus 38. Said apparatus 38 prevents said light from appearing at the wavelength 2 port of said apparatus 38. Apparatus 38 is commercially available from several vendors. Received light of wavelength 1 is converted from a light intensity/time signal to a voltage/time signal by optical receiver apparatus 46. Said voltage/time signal is the received baseband data signal. Said data signal is stored in buffer apparatus 47 for periodic sampling by said personal computer 15 via previously said ADB bus 48.

Similarly said optical coupler 45 passes on said light to the wavelength 1 port of said apparatus 45. Said apparatus 45 prevents said light from appearing at the wavelength 2 port of said apparatus 45. Apparatus 45 is commercially available from several vendors. Received light of wavelength 1 is converted from a light intensity/time signal to a voltage/time signal by optical receiver apparatus 49. Said voltage/time signal is the received baseband data signal. Said baseband signal is a frequency division multiplexed signal with the keyboard data carried on one carrier frequency and the mouse data on a second carrier frequency. Said baseband signal is received by and demodulated by the demodulator apparatus 50, said apparatus is well known in the art. The data signals demodulated by apparatus 50 is received by the personal computer 14 from keyboard receive cable 51, and mouse receive cable 52. The cathode ray tube video display monitors included in apparatus, 14 and 15, are not required.

Figure 2B:
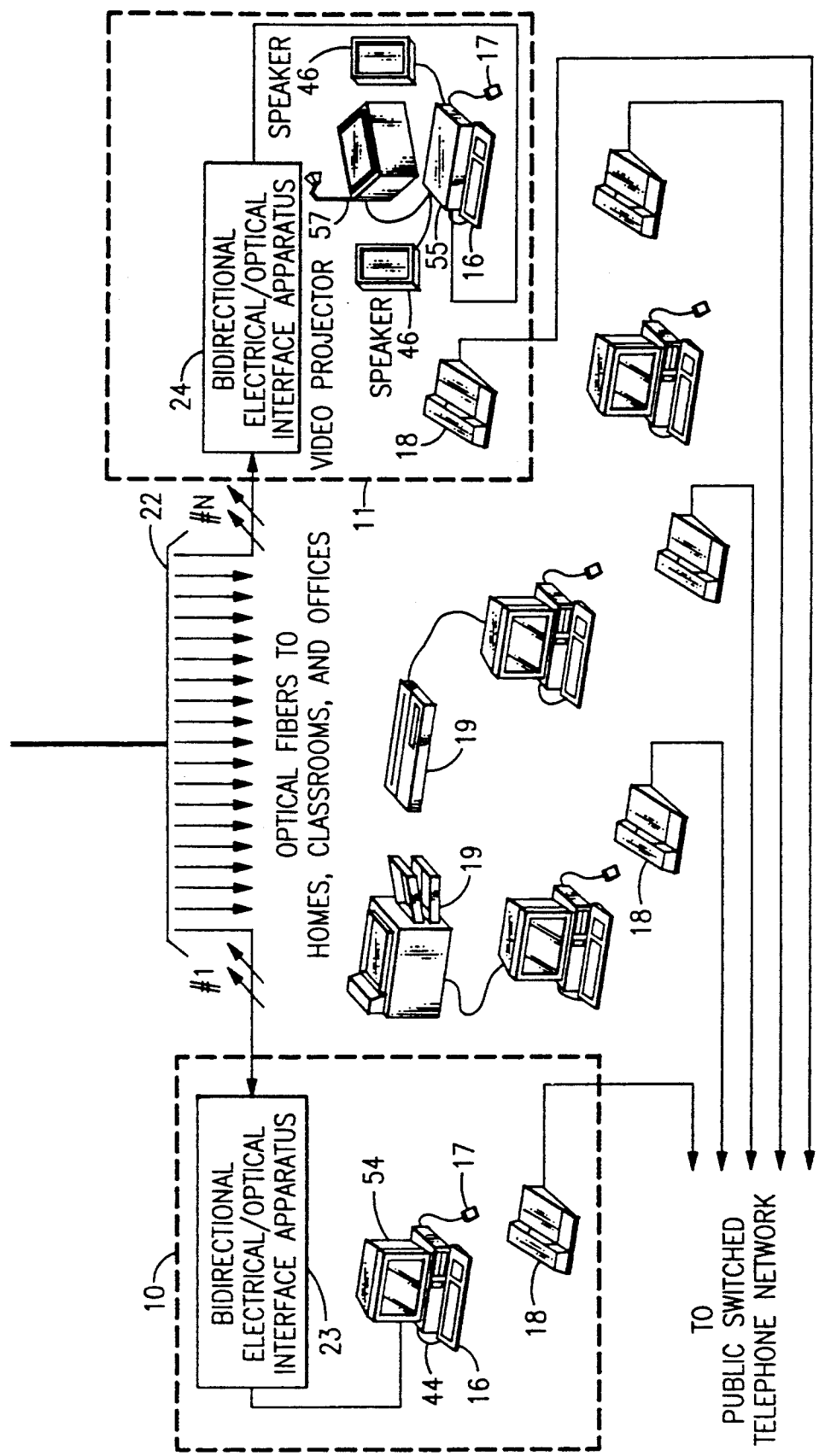
Figures 4, 4A:
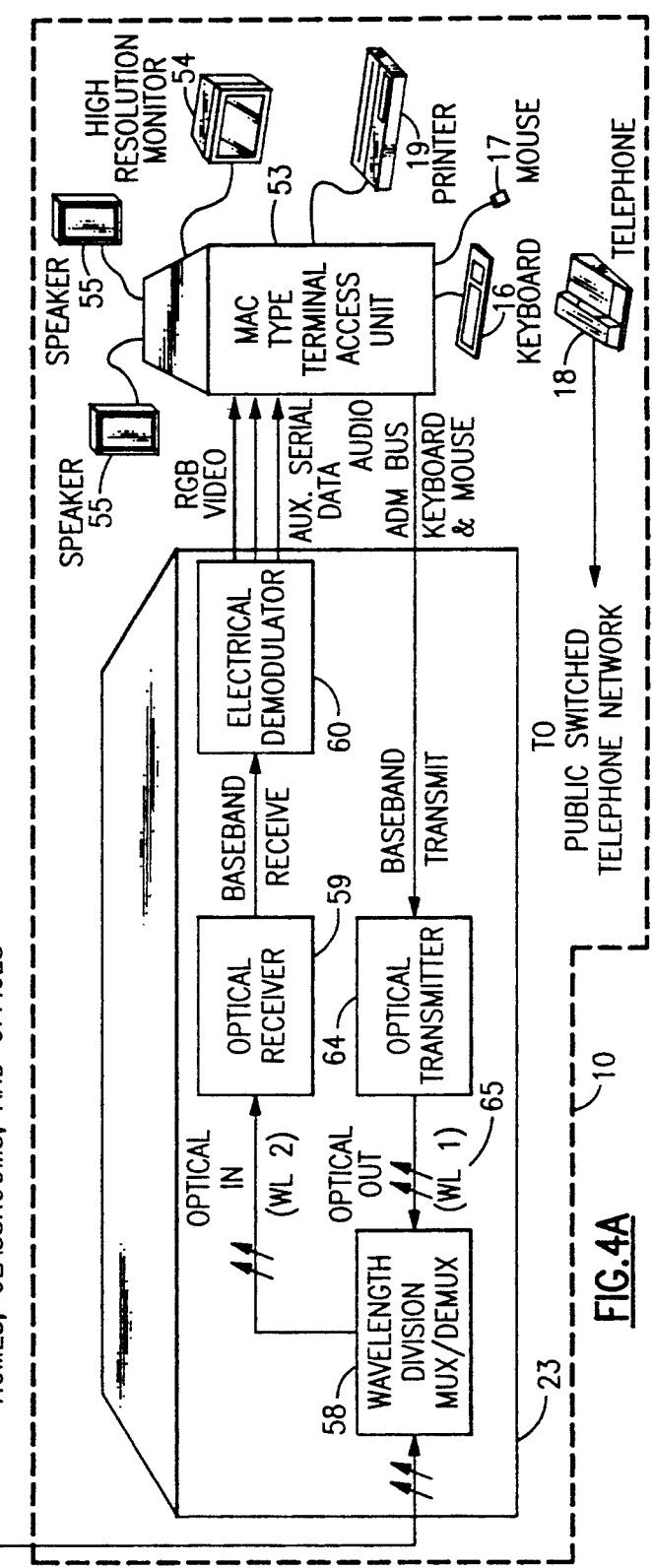
FIG. 4 is a general block diagram overview of the components and FIGS. 4A and 4B illustrate, in detail functional block diagram form, the components of the remote Bi-directional Electrical/Optical Interface Apparatus of FIG. 2B using wavelength division multiplexing of the out and return optical paths.
Figure 4B:
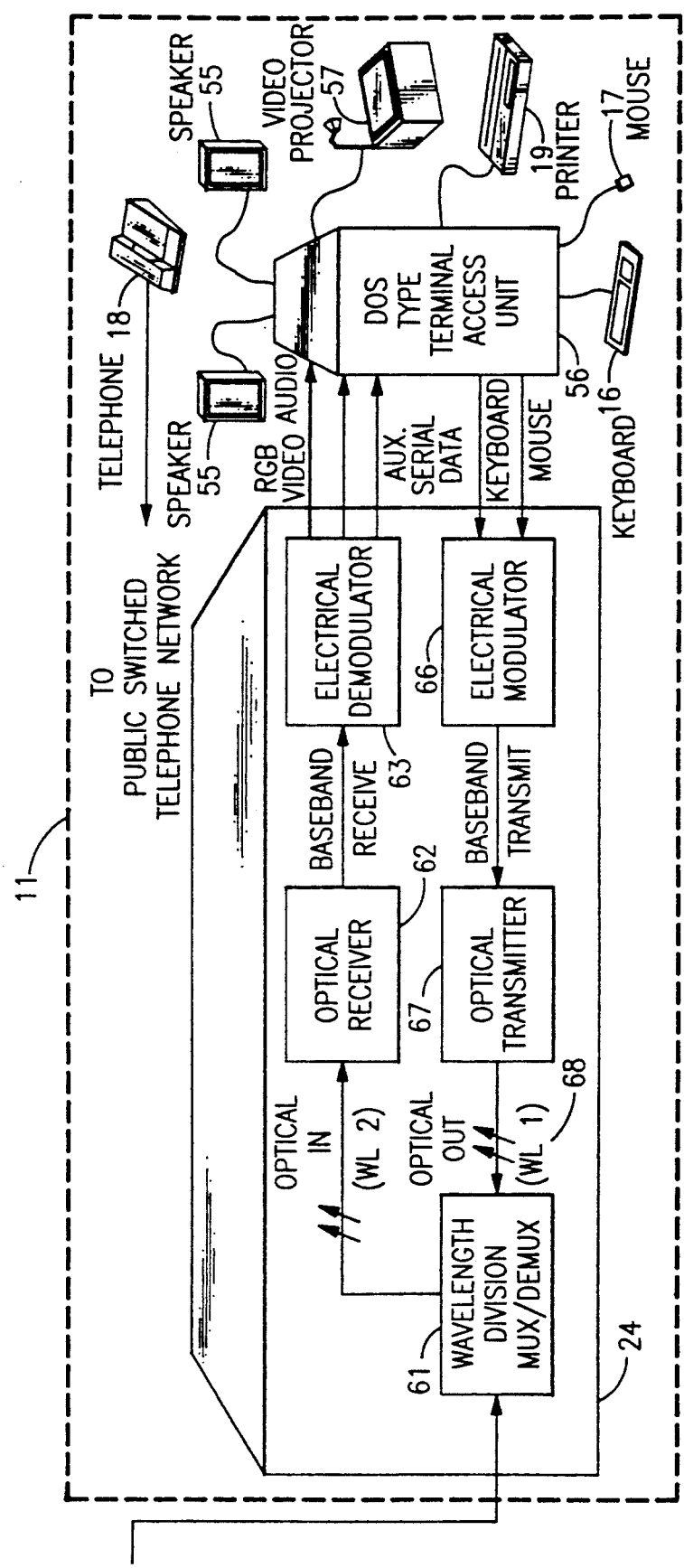

Referring now to FIGS. 4, 4A and 4B which shows in functional block diagram form the remote bi-directional electrical/optical components 10 and 11 of FIG. 2B and illustrates two configurations for the components of the bi-directional electric to optical interface apparatus, 10 and 11.

Apparatus 23 is the previously said bi-directional electrical/optical interface apparatus that permits a remote MAC type workstation terminal apparatus 53 and its associated peripheral devices, video display monitor 54, keyboard 16, mouse 17, audio speakers 55 and printer 19 to receive signals from and/or transmit signals to centrally located MAC type personal computers, shown as 15 in FIG. 3B.

Similarly apparatus 24 is the previously said bi-directional electrical/optical interface apparatus that permits a remote DOS type workstation terminal apparatus 56 and its associated peripheral devices, video display projector 57, keyboard 16, mouse 17, audio speakers 55 and printer 19 to receive signals from and/or transmit signals to centrally located DOS type personal computers, shown as 14 in FIG. 3A.

Said MAC type video monitor 54 may be substituted with a MAC type video projector similar to 57, and said DOS type video projector 57 may be substituted by a DOS type video monitor similar to 54.

Upon command of a workstation user, located at a remote MAC type workstation, previously said transmitted light of wavelength 2, as transmitted from a previously said MAC type computer 15, is switched to said user's remote workstation 10 and its bi-directional electrical/optical interface apparatus 23 by previously said optical switch 13 and associated optical cables 21, 9 and 22. Said light appears at the dual wavelength port of the wavelength division multiplexer apparatus 58. Said apparatus 58 transmits said light of wavelength 2 to the wavelength 2 receiver port of said device 58. Said light of wavelength 2 is prevented from being coupled to the wavelength 1 port of said device 58. Said wavelength division multiplex apparatus 58 is a commercially available apparatus from a plurality of vendors. Said optical signal of wavelength 2 is detected by light receiver apparatus 59. Said light receiver apparatus 59 linearly converts light intensity variation into a corresponding output voltage variation; said light receiver apparatus 59 is well known in the art. Said output voltage signal is known as the receive baseband signal. Said received baseband signal is transmitted to a demodulator apparatus 60. Said demodulator apparatus is comprised of, six frequency modulation demodulator circuits for recovery of previously said red video signal, green video with vertical synch signal, blue video signal, the horizontal synch signal, and the 2 audio signals; and a single phase shift keying or frequency shift keying demodulator for recovery of the RS 232C data signal. Said demodulator art is also well known. Said demodulated signals are transmitted from said demodulator apparatus to a MAC type terminal apparatus 53. Said apparatus 53 amplifies said received signals, as required for driving the following previously said peripheral apparatus, video display monitor 54, audio speakers 55, and printer 19.

Similarly upon command of a workstation user, located at a remote DOS type workstation, previously said transmitted light of wavelength 2, as transmitted from a previously said DOS type computer 14, is switched to said user's remote workstation 11 and its bi-directional electrical/optical interface apparatus 24 by previously said optical switch 13 and associated optical cables 21, 9 and 22. Said light appears at the dual wavelength port of the wavelength division multiplexer apparatus 61. Said apparatus transmits said light of wavelength 2 to the wavelength 2 receiver port of said device 61. Said light of wavelength 2 is prevented from being coupled to the wavelength 1 port of said device 61. Said wavelength division multiplex apparatus 61 is a commercially available apparatus from a plurality of vendors. Said optical signal of wavelength 2 is detected by light receiver apparatus 62. Said light receiver apparatus 62 linearly converts light intensity variation into a corresponding output voltage variation. Said light receiver apparatus 62 is well known in the art. Said output voltage signal is known as the receive baseband signal. Said received baseband signal is transmitted to a demodulator apparatus 63. Said demodulator apparatus is comprised of; seven frequency modulation demodulator circuits for recovery of previously said red video signal, green video signal, blue video signal, the horizontal synch signal, the vertical synch and the 2 audio signals; and a single phase shift keying or frequency shift keying demodulator for recovery of the RS 232C data signal. Said demodulator art is also well known. Said demodulated signals are transmitted from said demodulator apparatus to a DOS type terminal apparatus 56. Said apparatus 56 amplifies said received signals, as required for driving the following previously said peripheral apparatus, video display projector 57, audio speakers 55, and printer 19.

Said user of remote MAC type workstation 10 inputs commands for transmission to previously said personal computer 15 through non-simultaneous use of said keyboard 16 and mouse 17. Said command data is in a format compatible with the Apple Data Bus (ADB Bus) format. Said ADB bus format is well known in the art. Said keyboard and mouse data is transmitted to the MAC terminal apparatus 53 and subsequently to the optical transmitter unit 64. Said data directly modulates the output light intensity level of the optical transmitter. Said optical transmitter is comprised of an LED light source if the remote location is close to the central location, and a laser diode for distances requiring greater optical power levels. The light output of said optical transmitter is of wavelength 1. Said output light is coupled into single mode optical fiber 65 for transmission to the wavelength 1 port of the wavelength division multiplex apparatus 58. Said apparatus 58 passes on said wavelength 1 light to the wavelength 1/wavelength 2 port of said coupler apparatus 58 and prevents said wavelength 1 light from appearing at the wavelength 2 port of said apparatus 58.

Said wavelength 1 light is transmitter from remote workstation 10 to central computer 15 by the previously said optical transmission system comprised of apparatus 9, 13, 20, 21 and 22.

Similarly said user of remote DOS type workstation 11 inputs commands for transmission to previously said personal computer 14 through use of said keyboard 16 and mouse 17. Said keyboard and mouse data is transmitted to the DOS terminal apparatus 56 and subsequently to the modulator unit 66. Said keyboard and mouse data signals each modulate carriers of different frequencies using frequency shift key modulation or phase shift key modulation methods. Said modulation is provided by modulator unit 66, as well said apparatus 66 adds together said modulated carriers to produce a frequency division multiplexed baseband signal. Said baseband signal modulates the output light intensity level of the optical transmitter 67. Said optical transmitter is comprised of an LED light source if the remote location is close to the central location, and a laser diode for greater distances. The light output of said optical transmitter is of wavelength 1. Said output light is coupled into single mode optical fiber 68 for transmission to the wavelength 1 port of the wavelength division multiplex apparatus 61. Said apparatus 61 passes on said wavelength 1 light to the wavelength 1/wavelength 2 port of said coupler apparatus 61 and prevents said wavelength 1 light from appearing at the wavelength 2 port.

Said wavelength 1 light is transmitter from remote workstation 11 to central computer 14 by the previously said optical transmission system comprised of apparatus 9, 13, 21, 22, and 25.

FIGS. 5A and 5B show an alternative low cost bi-directional electrical/optical interface apparatus, 69 and 72, for the bi-directional operation of the fiber optic networked multimedia transmission system. The central location apparatus 69 permits same wavelength, bi-directional transmission, with minimum interference between the transmission, with minimum interference between the go and return directions using only low cost fiber optic components. Said apparatus 69 replace the previously described DOS type bi-directional electrical interface apparatus shown in FIG. 3A as 25.

The remote workstation apparatus 72 permits same wavelength, bi-directional transmission, with minimum interference between the go and return directions using only low cost fiber optic components. Said apparatus 72 replaces the previously described DOS type bi-directional electrical/optical interface apparatus shown in FIG. 4B as 24.

Apparatus 69 incorporates an optical directional coupler 70 to separate the same wavelength optical signals that are traveling in opposite directions through the optical fiber transmission line 21. Apparatus 70 replaces the wavelength division multiplex/demultiplex apparatus shown in FIG 3A as 45. Apparatus 70 does not distinguish between the desired optical signal that is transmitted from the optical transmitter 67 located at the remote workstation location shown as 11 in FIG. 4B, and the reflected component of the optical signal that is transmitted from the central locations optical transmitter shown in FIG. 5A as 43. Said reflected component is reflected back into said coupler 70 by transmission imperfections in the optical transmission system comprised of the fiber optic transmission lines 21, 9 and 22 and the optical switch 13, all are shown in FIGS. 2A, 2B and 2C. Said apparatus 70 is available from a plurality of vendors and is a lower cost apparatus than the previously described wavelenth division multiplexer/demultiplexer apparatus 45. Said desired and reflected signals are received from optical fiber 21 by said apparatus 70.

Electrical modulator apparatus 40 modulates each of a plurality of electrical signals, to be transmitted from said central location 12 to previously said remote workstation location 11, onto one of a plurality of higher frequency electrical carrier signals. Said carriers are subsequently used to modulate the light output of an optical transmitter, shown as 43 in FIG. 5A. Electrical modulator apparatus 66 modulates the keyboard signals and the mouse signals, to be transmitted from said remote workstation location 11 in FIG 4B to previously said central location 12, each onto one of two lower frequency electrical carrier signals. Said carriers are subsequently used to modulate the light output of an optical transmitter shown as 67 in FIG. 5B.

Said directional coupler 70 directs previously said received optical signals to the optical receiver shown in FIG. 5A as 49. Said optical receiver converts the modulated optical signal into an electrical baseband signal output. Said received baseband signal is comprised of the low frequency desired modulated electrical carrier signals, and the undesired, reflected, high frequency modulated electrical carriers. Said recovered electrical carriers are subsequently applied to the input of the low pass filter unit 71. Said filter unit 71 attenuates the unwanted reflected high frequency carriers but passes on the desired low frequency carriers. Said desired carriers are subsequently demodulated by the electrical demodulator apparatus 50.

Similarly the high pass filter unit 73 accepts the desired central location transmitted high frequency carriers and attenuates the reflected low frequency carriers.

Similarly to FIGS. 5A and 5B and FIGS. 6A and 6B shows an alternative low-cost bi-directional electrical/optical interface apparatus, 74 and 76, for the bi-directional operation of the fiber optic networked multimedia transmission system. The central location apparatus 74 permits same wavelength, bi-directional transmission, with minimum interference between the go and return directions using only low cost fiber optic components. Said apparatus 74 replaces the previously described MAC type bi-directional electrical interface apparatus shown in FIG. 3B as 20. The remote workstation apparatus 76 permits same wavelength, bi-directional transmission, with minimum interference between the go and return directions using only low cost fiber optic components. Said apparatus 76 replaces the previously described MAC type bi-directional electrical/optical interface apparatus shown in FIG. 4A as 23. The light output from the optical transmitter 64 is directly modulated by the applied ADB Bus signals, thus using DC or 0 Hertz as the electrical carrier frequency in the remote location to central location direction.

Now that the invention has been described and depicted in relation to a specific embodiment for the purpose of illustrating the manner in which the invention may be used to advantage, numerous substitutions and modifications will occur to those skill in the art which should be considered to be within the scope of the invention as defined in the claims following.

We claim:

1. A metropolitan area network for transport of computer generated video images and computer user input comprising:

at least one central facility housing a plurality of personal computers each computer provided with storage apparatus for retaining software and data for producing high resolution multimedia video images, each said personal computer having a keyboard input port, mouse input port and a video image output port; an electrical to optical interface device provided for each personal computer, each interface device having: an optical input path for producing electric signalling in response to an input light beam on corresponding electrical terminations for said keyboard input port and mouse input port, said signalling adapted to be processed by the personal computer as keyboard input or mouse input respectively, and each interface device having: an optical output path for producing a modulated light beam in response to electrical signalling received on a corresponding electrical termination for said video image output port of said personal computer; a first fiber optic cable optically coupled to the optical input path and optical output path of said interface device extending therefrom and terminating at a fiber optic matrix switch configured to optically couple said first fiber optic cable to a second fiber optical cable extending to one of a plurality of remote user locations;

each said remote user location having a fiber optic cable extending therefrom and optically terminated at one end on said fiber optic matrix switch of said central location and at the other end on an electrical to optical interface each interface device having: an optical output path for producing a modulated light beam in response to electrical signalling received on corresponding electrical terminations adapted to be attached to a computer keyboard device and a computer mouse device for producing said electrical signalling, and each interface device having: an optical input path for producing electric signalling in response to an input light beam on a corresponding electrical termination adapted to be attached to a video image display responsive to said electrical signalling;

whereby user operation of said remotely located keyboard and mouse devices results in computer processing to occur at a corresponding centrally located personal computer the result of which processing is presented to said user on the remotely located video display.

2. A network as claimed in claim 1 further including a matrix switch control computer connected to the public switched telephone network for receiving and processing user input tones over said telephone network to activate said fiber optical matrix switch o optically couple a selected first fiber optical cable with a selected second fibre optical cable whereby a user location may be in communication with a selected workstation at said central location.

3. A network as claimed in claim 1 wherein said centrally located interface device and said remote user location interface device are provided with an optical directional coupler for each respective fibre optical cable terminating thereon to permit the same wavelength of light to be used for the bi-directional optical communications over said fiber optical cables.

4. A network as claimed in claim 1 wherein said centrally located interface device and said remote user location interface device are provided with a wave division multiplexor demultiplexer for each respective fibre optical cable terminating thereon to permit a different wavelength of light to be used for the out and in direction of optical communications over said fiber optical cables.

* * * * *